March 8, 1966  W. B. DARR  3,238,982
TIRE-HOLDING WHEEL FOR TREAD BUILDING AND BUFFING MACHINES
Filed Dec. 3, 1962
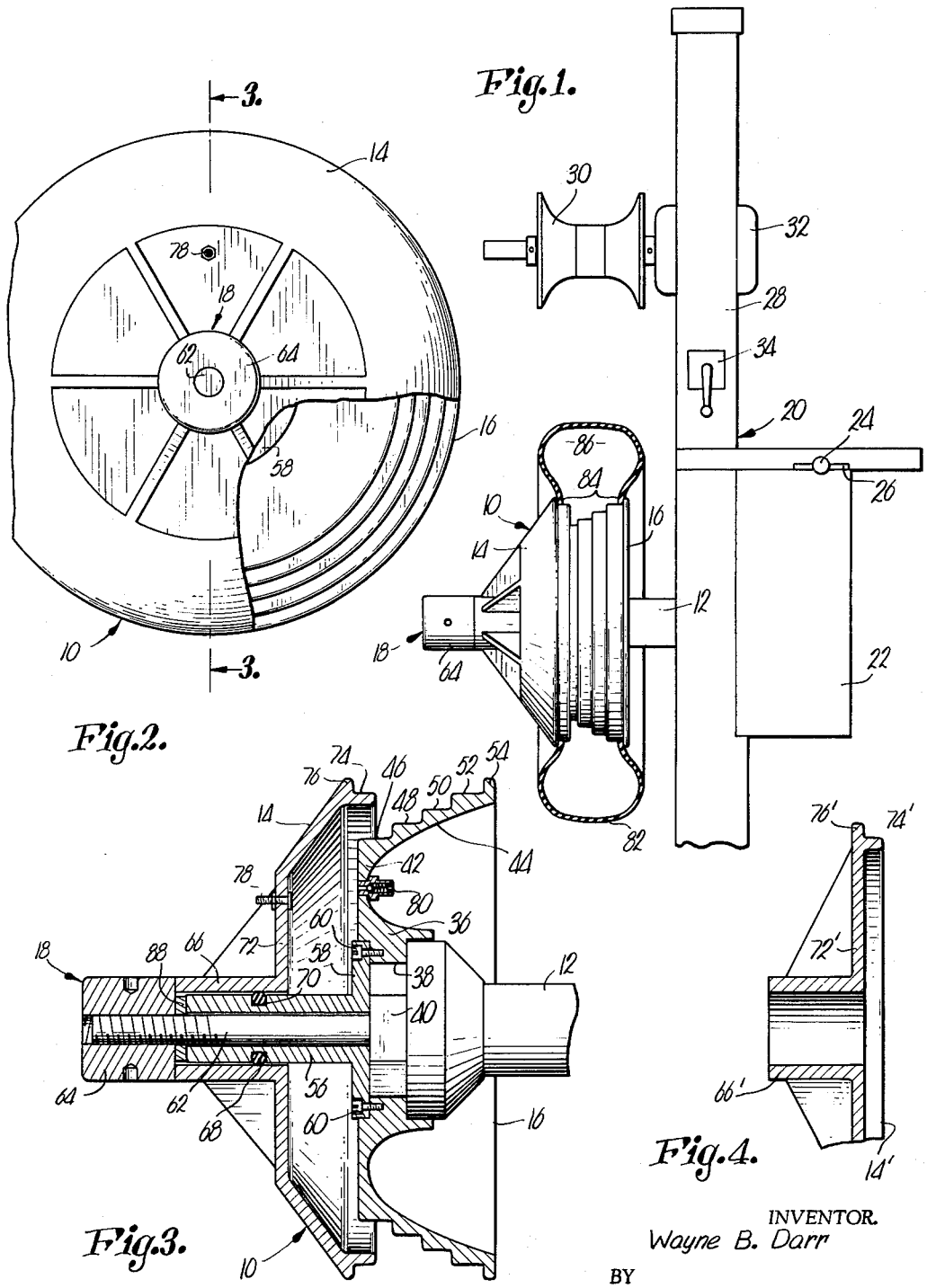
INVENTOR.
Wayne B. Darr
BY
Hovey, Schmidt, Johnson & Hovey.
ATTORNEYS.

United States Patent Office 3,238,982
Patented Mar. 8, 1966

3,238,982
TIRE-HOLDING WHEEL FOR TREAD BUILDING
AND BUFFING MACHINES
Wayne B. Darr, N. Main St., Seneca, Mo.
Filed Dec. 3, 1962, Ser. No. 241,733
4 Claims. (Cl. 144—288)

This invention relates to tire-mounting apparatus and, more particularly, to rotatable structure which is precisely balanced and which mounts an inflatable tire thereon so that various operations may be performed on the tire when the same is inflated and in the mounted condition on the structure.

The present invention relates to the problem of the retreading of an inflatable tire wherein the tire casing is initially buffed prior to the application of a bonding agent thereto, followed by the placing of camelback on the casing and the usual molding operation for curing the camelback. Heretofore, conventional rims have been utilized for mounting the tire on a rotatable shaft for performing the above-mentioned operations but, in view of the fact that the rims are not necessarily truly round or in balance, the tire disposed on the rim is defectively treated owing to the fact that the camel-back applied thereto is not necessarily in the proper position on the casing. This defect renders the finished tire undesirable since it too is out of round and out of balance.

Also, the tire-mounting rims heretofore utilized were disadvantageous from the standpoint of having to change the rim each time a tire was placed thereon which was of differing diameter than the tire previously treated. When the bead diameters of the tires change, altogether different rims must be placed in position for mounting the tires, all of which consumes a considerable time and effort on the part of the individual responsible for the retreading operations. With respect to the latter problem, special rings or shims have been employed to vary the rim diameter to accommodate tires of differing bead diameters. The use of such rings or shims is undesirable since considerable time and effort is expended in placing the same on and taking the same off the rims and they have very little effect on the rim when the latter is out of round or out of balance.

The present invention circumvents the difficulties encountered in the use of tire-mounting means employed for retreading tires by providing mounting structure which may be placed in perfect alignment for rotation about an axis so that when the tire to be treated is placed thereon the tire will also be perfectly aligned and rotatable about the same axis. It is also contemplated that the alignment of the structure forming the present invention need only be checked at periodic intervals to assure that the same is in condition for the retreading of tires at all times.

The present invention also provides means for mounting tires of differing bead diameters thereon so as to reduce the time and effort expended by utilizing tire-mounting rims of the type heretofore employed for this type of work.

It is, therefore, the primary object of the present invention to provide tire-mounting means which may be perfectly aligned and balanced so that when the structure is rotated and carries a tire to be treated thereon, the tire itself will be in perfect alignment and in proper balance to thereby assure that the tire is not defectively treated by virtue of its being out of round or out of balance.

Another object of the present invention is the provision of rotatable, tire-mounting structure which is readily usable and which can be placed in operation without requiring special tools whereby the time and effort normally expended for mounting tires to be treated with structures heretofore employed is sharply reduced to thereby minimize the over-all treating period.

Still another object of the present invention is the provision of tire-mounting means of the type described which is provided with means for accommodating tires of differing bead diameters with only a minor modification thereto, whereby the tires of various diameters may be readily mounted for rotation without having to completely change the tire-mounting structure.

Other objects of this invention will become apparent as the following specification progresses, reference being had to the accompanying drawing, wherein:

FIGURE 1 is a side view of the tire-mounting structure of the present invention and illustrating the use thereof with means for rotating the shaft forming a part of the present invention, there being an inflatable tire disposed on the mounting structure with the tire being shown in section;

FIG. 2 is an enlarged end view of the mounting structure with parts being broken away to reveal details of construction;

FIG. 3 is a cross-sectional view taken along line 3—3 of FIG. 2; and

FIG. 4 is a fragmentary, cross-sectional view of one of the bead-engaging members which forms a part of the mounting structure.

The present invention provides inflatable tire-mounting means including a shaft and a pair of relatively shiftable members carried by the shaft. Each of the members is provided with a continuous, peripheral bead-engaging surface and a flange adjacent the surface for retaining the bead in engagement thereon. The members form with the tire an air-receiving chamber so that when the beads are in engagement with the surfaces and retained by the flanges, the tire is inflated to the proper size for treatment purposes. The members are initially placed in perfect alignment and in balance so that the treated tire will also be perfectly aligned and in balance.

The mounting structure forming the present invention is broadly denoted by the numeral 10 and includes a shaft 12, a pair of tire-mounting members 14 and 16 shiftable relatively along shaft 12, and a retainer 18 for limiting the relative movement of members 14 and 16.

Shaft 12 is generally rotatable and preferably forms a part of the shaft rotating machine broadly denoted by the numeral 20 which is described in my previous disclosure entitled "Tire Processing Apparatus," now U.S. Letters Patent No. 2,965,152, issued December 20, 1960. In said disclosure, shaft 12 is rotated at high and low speeds by mechanism (not shown) within a housing 22 and controlled by a lever 24 shiftable in opposed directions within a slot 26 above housing 22. An upright standard 28 carries housing 22 and also a pressure-applying rotor 30 actuated by an electric motor 32 disposed above housing 22. A valve 34 controls a cylinder and piston assembly (not shown) for raising and lowering rotor 30 into and out of engagement with the periphery of a tire mounted on shaft 12. It is to be noted that machine 20 forms no part of the present invention and has been described merely to illustrate one application of the present invention.

Member 16 is provided with a hub 36 having a polygonally-shaped opening 38 therethrough for complementally receiving a head 40 forming a part of shaft 12.

A disc-like body 42 is integral with hub 36 and a substantially conically-shaped portion 44 is integral with body 42 and extends laterally and outwardly therefrom in the direction of shaft 12 as is clear in FIG. 3. Portion 44 is provided with a number of continuous, peripheral surfaces 46, 48, 50 and 52 thereon which decrease in diameter as body 42 is approached. A flange 54 is disposed adjacent surface 52, and the riser portions of surfaces 48, 50 and 52 serve as similar flanges for surfaces 46, 48 and 50 respectively.

A sleeve 56 is provided with a base 58 secured to hub 36 by machine screws 60 in a manner such that sleeve 56 extends outwardly from member 16 opposed to the direction in which portion 44 extends. Sleeve 56 surrounds an extension 62 forming a part of shaft 12 and of a reduced diameter relative thereto. The outer end of extension 62 is threaded to receive a spindle nut 64 forming retainer 18.

Member 14 is provided with a hub 66 which is telescoped over sleeve 56 and therefore, movable relative thereto. An O-ring seal 68 disposed in an annular groove 70 in sleeve 56 engages the inner surface of hub 66.

Member 14 is provided with a body 72 integral with hub 66 and includes a continuous, peripheral surface 74 concentric with hub 66. A flange 76 is disposed adjacent surface 74. It is noted that flange 76 and the radially innermost part of body 72 are in spaced, transverse planes and that surface 74 is approximately of the same diameter as surface 52 of member 16.

A valve 78 is carried by member 14 to permit the introduction of air under pressure into the region between members 14 and 16. A relief valve 80 is carried by member 16 to give vent to the air under pressure between the members 14 and 16 when the pressure exceeds a predetermined value.

In operation, an inflatable tire 82 is disposed on members 14 and 16 in surrounding relationship to shaft 12 as is clear in FIG. 1. Generally, the opposed beads 84 of the tire 82 will be closer together in the deflated condition of the tire than when the tire is in an inflated condition. Member 14 is manually shifted toward member 16 until beads 84 engage both surfaces 52 and 74 and also substantially engage flanges 54 and 76. In these positions, members 14 and 16, and tire 82 present an air-receiving chamber 86 which is substantially sealed from the surrounding atmosphere by virtue of the presence of seal 68.

Air under pressure is introduced into chamber 86 through valve 78 and, the pressure of the air tends to inflate tire 82 to cause beads 84 to move apart. The movement of beads 84 in turn forces member 14 away from member 16 until hub 66 engages nut 64 to prevent further movement of member 14 relative to member 16. When this occurs, the beads 84 are properly spaced-apart in relation to their normal spacing on a conventional rim. The mechanism in housing 22 may then be actuated by the manipulation of lever 24 either to cause shaft 12 to rotate at a lower speed or at a high speed.

It is to be emphasized that members 14 and 16 may be placed in perfect alignment and in perfect balance prior to the use thereof for mounting tire 82. Thus, the treatment of the tire 82 may be accomplished without forming defects in the tire due to the improper alignment of structure 10.

As shown in FIG. 3, a spacer 88 may be utilized between the end of sleeve 66 and nut 64 to limit the inward travel of nut 64 toward member 16. This in effect, has the result of spacing flanges 54 and 76 further apart to accommodate increased bead widths.

When it is desired to mount a tire 82 having a decreased bead diameter, member 14 is removed and replaced with a member 14' illustrated in FIG. 4 which is provided with a hub 66' adapted to be disposed over sleeve 56. A body 72' integral with hub 66' is provided with a bead-engaging surface 74' and a flange 76' adjacent surface 74'. Surface 74' is, for instance, of the same diameter as surface 46 on member 16 so that a tire 82 having bead diameters equivalent to the diameters of surfaces 46 and 74' may be accommodated on members 14' and 16. It is noted that body 72' and flange 76' are in substantially the same transverse plane owing to the fact that the proper spacing between flange 76' and the flange corresponding to surface 46 must be maintained for the particular bead width of the tire mounted on the structure 10.

For bead diameters intermediate the diameters of surfaces 46 and 52, additional members 14 will be required, such members being configured to assure the proper bead width when the corresponding ends of the hubs 66 engage nut 64.

To remove the tire 82 from between members 14 and 16 the tire is initially deflated and the beads are pressed together to allow them to be moved out of engagement with at least one of the flanges 54 or 76. The tire is then removed from structure 10.

It is noted that the spacing between flanges 54 and 76 may be readily varied by the utilization of one or more spacers 88 carried on extension 62. Nut 64 is of the type which is manipulated by a spanner wrench so that the same is readily placed on and removed from the threaded end of extension 62.

Any number of tires having the same bead diameters may be placed on and removed from structure 10 without dismantling or disassembling the same, the only requirement being that the members 14 and 16 be moved together until air is introduced into the chamber 86 formed by members 14 and 16 and tire 82.

When it is desired to treat tires of differing bead diameters, only member 14 need be removed and this can be readily accomplished by moving nut 64 off extension 62, replacing member 14 with a similar member of differing surface diameters, and once again placing nut 64 on the threaded end of extension 62.

The present invention is especially advantageous for use with tires whose casings are worn to the extent that the beads are closer together than they should be. The tires are readily inflatable by merely forcing member 14 against member 16, regardless of the condition of the tire so long as the beads engage flanges 54 and 76.

In conventional tire mounting structures, a band has been wrapped about the tread of a tire to be processed so as to spread the beads of the tire apart and against rim flanges. The engagement of the beads with the rim flanges effected a seal so that the tire could then be inflated. The mounting structure of the present invention obviates the use of the band by reason of the fact that members 14 may be shifted manually toward member 16 to effect the seal with the tire beads. Thereafter, the beads are spread apart as the tire is inflated and member 14 moves away from member 16 to a location, so that the beads are properly spaced apart.

Both members 14 and 16 may be readily removed from shaft 12. This permits the mounting of other equipment on shaft 12 such as a rim and tire for wheel balancing purposes. Also, additional members similar in construction to members 14 and 16 may be placed on shaft 12 to process truck or tractor tires.

Having thus described the invention, what is claimed as new and desired to be secured by Letters Patent is:

1. Mounting structure for an inflatable tire having a pair of opposed beads comprising:

a rotatable shaft;

a pair of members each having a hub and a body extending upwardly from said hub;

means securing the hub of one of said members to one end of said shaft for rotation therewith, the hub of the other member being tubular and being concentrically mounted on said shaft for axial movement relative thereto toward and away from said one member;

structure on the outer periphery of each of the bodies of said members for engaging and retaining a corresponding bead of a tire when the hubs are on the shaft and when the tire surrounds the shaft, said members being disposed to present with said tire an air-receiving chamber when the beads of the tire engage said structures;

an annular seal mounted on said shaft in sealing relationship to said tubular hub and disposed normally between the ends thereof;

fluid valve means in communication with said chamber and providing a fluid inlet therefor for the passage of air under pressure thereinto; and a stop removably mounted on the opposite end of said shaft, said tubular hub being movable relative to the shaft between the hub of said one member and said stop, said seal being in sealing relationship to said tubular hub for all positions of the latter between said stop and said hub of said one member.

2. Mounting structure as set forth in claim 1, wherein one of said members is provided with a number of bead-engaging surfaces concentric with said shaft and of progressively decreasing diameters as the other of said members is approached, there being a bead-retaining flange on said one member for each of said surfaces whereby tires having different bead diameters my be utilized with said one member when the diameter of the surface of the other member is equal to the diameter of the beads of the tire.

3. Mounting structure as set forth in claim 2, wherein the bead-engaging surface of said other member is aligned with a corresponding bead-engaging surface on said one member adjacent the outermost portion thereof, said other member being concave to receive a portion of said one member when the tubular hub is adjacent to said hub of said one member.

4. Mounting structure as set forth in claim 1, wherein said shaft includes a sleeve having an annular recess therein on the outer surface thereof, said sealing means being disposed in said recess and projecting outwardly from said sleeve.

References Cited by the Examiner

UNITED STATES PATENTS

| | | | |
|---|---|---|---|
| 2,965,152 | 12/1960 | Darr | 154—9 |
| 2,973,791 | 3/1961 | French | 144—288 |
| 2,986,182 | 5/1961 | Roesch | 144—288 X |
| 2,989,799 | 6/1961 | White | 144—288 |
| 2,992,675 | 7/1961 | Bakke | 144—288 X |
| 3,042,090 | 7/1962 | Foster | 144—288 |
| 3,042,091 | 7/1962 | Dunton | 144—288 |

WILLIAM W. DYER, Jr., *Primary Examiner.*

EARL EMSHWILLER, *Examiner.*